United States Patent [19]

Strobel et al.

[11] Patent Number: 4,971,811
[45] Date of Patent: Nov. 20, 1990

[54] PROCESS FOR MAKING CONCENTRATED FRUIT JUICE

[75] Inventors: Rudolf G. K. Strobel; Edmund P. Pultinas, Jr., both of Cincinnati; Michael L. Vatter, Okeana, all of Ohio

[73] Assignee: The Procter & Gamble Company, Cincinnati, Ohio

[21] Appl. No.: 379,530

[22] Filed: Jul. 14, 1989

[51] Int. Cl.⁵ .............................. A23L 2/02
[52] U.S. Cl. ........................ 426/50; 426/51; 426/387; 426/599; 426/61
[58] Field of Search .............. 426/50, 51, 387, 599, 426/61

[56] References Cited

U.S. PATENT DOCUMENTS

| | | | |
|---|---|---|---|
| 2,641,550 | 6/1953 | Dykstra et al. | 99/205 |
| 3,118,776 | 1/1964 | Byer et al. | 99/205 |
| 3,140,187 | 7/1964 | Brent | 99/205 |
| 3,248,233 | 4/1966 | Brent et al. | 426/387 |
| 4,374,865 | 2/1983 | Strobel | 426/599 |
| 4,463,025 | 7/1984 | Strobel | 426/599 |
| 4,561,941 | 12/1985 | Dinnage et al. | 26/387 |

FOREIGN PATENT DOCUMENTS

| | | | |
|---|---|---|---|
| 0700061 | 12/1964 | Canada | 426/387 |
| 1243890 | 11/1988 | Canada | 99/83 |
| 0298954 | 1/1989 | European Pat. Off. | |

OTHER PUBLICATIONS

Food Engineering, "Cloud Stable Vegetable Puree with New Enzymes", 7/87, pp. 39–40.
Rohm Tech., Inc. Product Bulletin, #134, 6/87.
J. Agric. Food Chem., Vol. 26, No. 2, 1978, Essam M. Ahmed, Raymond A. Dennison, Philip E. Shaw, "Effect of Selected Oil and Essence Volatile Components on Flavor Quality of Pumpout Orange Juice".

Primary Examiner—Marianne Cintins
Attorney, Agent, or Firm—R. A. Dabek; J. J. Yetter; R. C. Witte

[57] ABSTRACT

This invention relates to an efficient process for separating and recovering aroma and flavor volatiles from fruit or vegetable juices and for lowering the pectin levels in cloudy juices. The process involves removing the aroma/flavor volatiles from juice by forming a microaerosol by spraying juice at a temperature of from 45° C. to 110° C. through a nozzle having a diameter of about 100 microns to 600 microns at a velocity of 100 m/sec. to 250 m/sec. and into a vacuum chamber at 5 mm to 200 mm Hg and at temperatures of from 10° C. to about 55° C. and then treating the recovered juice fraction with a pectinase which is essentially free of esterases. The decreased pectin level increases the gustatory display of the aroma/flavor and improves the mouthfeel of the beverage. Decrease of the pectin level is achieved essentially without the formation of methanol and essentially without the hydrolysis of important aroma ester compounds. Clear juices containing a virtually pristine composition of aroma volatiles are produced after ultrafiltration of the special enzyme treated cloudy juices.

20 Claims, No Drawings

PROCESS FOR MAKING CONCENTRATED FRUIT JUICE

TECHNICAL FIELD

This invention relates to an efficient process for separating and recovering aroma and flavor volatiles from fruit or vegetable juices, for lowering the pectin levels of cloudy, viscous juices thus making a less viscous improved processed beverage which can be clear or cloudy. The beverage is characterized by its improved flavor display due to retention of more than about 75% of the aroma and flavor volatiles originally present in the beverage before processing, and by its lower pectin content, lower viscosity and higher clarity.

BACKGROUND OF THE INVENTION

Consumption of noncarbonated fruit and vegetable juices has greatly increased since 1950 due to technological breakthroughs in the juice processing and concentration industry. Methods of eliminating sediment, flash pasteurization, concentrating, freeze concentrating, blending, freezing, and drying or crystallization all contributed to this phenomenal growth by providing better quality, better tasting and higher purity juice products which are more convenient to use.

The challenge of producing beverages which are acceptable to a broad range of consumers involves making a unique product having an acceptable flavor, distinctive aroma, acceptable appearance and satisfactory mouthfeel. The aroma and flavor ingredients and the level of pectin in beverages affect each of these characteristics.

During the process of concentrating beverages, especially those involving evaporation, a significant portion of the aroma and flavor volatiles are removed with the water vapors. These volatiles consist of various alcohols, esters, aldehydes, ketones, acids, etc. This loss results in a significant deterioration in quality and overall flavor of the concentrated beverage.

Evaporation processes involve heating the beverage under conditions which promote hydrolysis and/or oxidation of components of the beverage. This causes chemical alterations of the aroma and flavor compounds as well as other materials. For instance, lipids can be oxidized and the amino acids and sugars can undergo browning reactions. Such degradation products can cause off flavors in the concentrated beverage. Thus, conventional evaporation processes frequently result in off-flavors and flavor loss in the juice product produced. Pectin and pulp in the beverage adsorb aroma and flavor components which also contributes to lower display of aroma and flavor levels.

Numerous methods have been devised to compensate for the loss of aroma and flavor during evaporation concentration processes. For instance, U.S. Pat. No. 4,463,025, Strobel, issued Jul. 31, 1984, discloses a process for preparing a fruit juice concentrate prepared from natural citrus fruit ingredients. This process involves freeze concentration. The citrus fruit juice concentrate has at least 35% solids including pulp, non-volatile compounds, pectin and volatile compounds. This citrus fruit juice concentrate has at least 65% of the aroma and flavor volatile compounds of the natural juice. (See also U.S. Pat. No. 4,374,865 to Strobel (1983), which claims a concentrated orange juice).

U.S. Pat. No. 3,248,233 Brent et al., issued Apr. 26, 1966, discloses a method of minimizing the overall loss of aroma and flavor compounds by collecting "essence" of the juice. Essence is the term applied to the first 15% to 20% of the water which is removed through evaporation and which contains a significant amount of volatile aroma and flavor compounds. The escaping essence is condensed, the aroma and flavor compounds recovered and rectified as water is removed, and then added back to concentrated juice. U.S. Pat. No. 3,140,187 Brent, et al, issued Jul. 7, 1964, discloses a juice concentration method.

U.S. Pat. No. 3,118,776, Byer et al., issued Jan. 21, 1964, discloses a multi-step process for recovering the volatile flavor fraction from fruit juices at temperatures of less than 120° F. (49° C.). In a closed system, a thin continuous film of citrus juice is distributed over a heat exchange surface at a substantially reduced pressure to partially concentrate the juice by separating it into two components. The minor fraction containing the aroma and flavor volatiles is condensed and removed. After another separation, the remaining mixture is distilled at a temperature below 100° F. (38° C.) and a pressure of less than 1.5 inches mercury (57.5 mm Hg).

U.S. Pat. No. 2,641,550, Dykstra et al, issued Jun. 9, 1953, discloses the removal of volatiles from orange juice via heating, evaporating under vacuum or by stripping with an inert gas, e.g., nitrogen. Three condensers are used to condense the vapors. The first-stage condenser is maintained at 32° F. (0° C.) to 85° F. (29° C.); 90% to 98% of the distillate is removed. This first fraction is discarded. The second stage condenser is maintained at 32° F. (0° C.) to −95° F. (−139° C.), while the third stage condenser is maintained below −130° F. (−202° C.). The distillates recovered from the second and third stage condensers are later added to the orange juice concentrate.

Each of these procedures is not totally satisfactory because only a fraction of the escaping aroma and flavor volatile compounds can be collected and recovered. Thus, there is necessarily a significant loss in the overall aroma and flavor of the final concentrated product.

Others have tried different procedures for adding back certain volatile compounds and essences to concentrated beverages to enhance the overall flavor and consumer acceptability of the juice. For example, Ahmed et al, *J. Agri. Food Chemistry*, 26.2, 368–372 (1978), describe the addition of certain volatile compounds and essences to juice concentrate after their recovery from the evaporator. The objective was to match the aroma and flavor found in fresh orange juice.

It is generally recognized that while evaporation concentration processes are useful and fairly effective, there is still a significant loss of aroma and flavor compounds which occurs.

Freeze concentration equipment provides an alternative to the use of evaporators. In freeze concentrators the objective is to remove water in the form of ice crystals without removing significant amounts of aroma and flavor volatiles. However, while freeze-concentration may be satisfactory to achieve aroma/flavor retention during water removal, it is not a desirable procedure for processing fruit with undesirable aroma and flavor characteristics such as those found in green fruit. Moreover, freeze concentration plants require significantly more capital investment than plants based on evaporation techniques.

Fruit juices also contain pectin and methoxylated pectins. Pectins are polycarbohydrate materials which are linked through a glycoside or galactoside linkage. The pectins form a "cloud" in the beverage, making it opaque and viscous. Pectins can be removed by filtration and by hydrolyzing them to make them smaller units of glycocidic linkages. A pectinase enzyme is used to hydrolyze pectin. However, many pectinases also contain enzymes that hydrolyze esters in order to hydrolyze the methyl esters of methylpectins. This removes some of the methyl esters from the pectin thus reducing steric hindrance so that more of the pectin can be depolymerized. However, the removal of these methoxy groups creates methanol in the beverage. In addition, since these esterases are nonspecific and hydrolyze any ester linkage, they may also hydrolyze the important aroma and flavor volatile esters.

The hydrolysis of pectins in fruit juices and fruit puree by using pectinases is known.

*Food Engineering,* (Jul. 1987) *Cloud Stable Vegetable Purees with New Enzymes"* describes the advantage of Rohapect® Mac, a pectinase, as lowering the mass viscosity of purees for easier pressing and producing higher juice yields.

Canadian Patent No. 1,243,890 issued to Beveridge, et al (1988) describes a process for producing light colored fruit juices from apples or pears. A fruit puree which has been heated to destroy color contaminating enzymes is treated with a pectinase and a cellobiase enzyme containing composition. This produces a clear juice. A pectinase enzyme was used on apple puree before the fruit was treated with cellobiase.

EP 298,954 issued to Birkner, et al (1989) discloses the use of immobilized amylase and pectinase to treat juices.

It has been found that it is important to remove pectins, particularly in apple juice, not only because pectins make the juice opaque and viscous but because lowering the pectin levels increases the flavor display and improves the mouthfeel of the juice. This adds significantly to consumer acceptance. Decrease of the pectin level is achieved herein without the formation of methanol and essentially without the hydrolysis of important aroma esters. Thus the integrity of the juice aroma and flavor is retained even though the juice is processed.

Therefore, it is an object of this invention to produce an apple juice which is less viscous by hydrolyzing the pectins using pectinases which are substantially free of esterase activity. This produces a cloudy or clear beverage with decreased viscosity and improved mouth feel with increased aroma and flavor display. The increase in flavor is due to: (1) maintaining the integrity of the aroma and flavor esters and (2) decreasing the adsorption sites of the pectin, i.e. keeping more aroma and flavor materials available for tasting and smelling. This invention produces a clear juice after ultrafiltration of the special enzyme treated juice without further degrading the remaining highly esterified pectins. This juice is not contaminated with copious quantities of methanol.

It is a further object of the present invention to provide a process for producing a less viscous, cloudy or clear beverage or beverage concentrate which contains at least 75%, and in some instances as much as 90% or more of the aroma and flavor volatiles present immediately after extraction of the juice. This present invention also provides a process that is capable of removing the undesirable aroma and flavor components from fruit and vegetable juices without attacking the dissolved solids (e.g. sugars, amino acids, vitamins, phenolic materials, etc.) in the juices.

It is still a further object of this invention to instantaneously separate the desirable aroma and flavor components from fruit and vegetable juices without damaging the dissolved solids and to recapture these aroma and flavor volatiles for addition back to the concentrated fruit and/or vegetable juice.

It is still a further object of this invention to provide a means for pasteurizing a juice beverage before the separation of the aroma and flavor components.

It is also an object of this invention to remove substantially all of the oxygen from a juice beverage in order to prevent flavor degradation due to caramelization of the sugar, browning reactions, oxidation of phenolic and lipid components, and other chemical oxidation reactions of the aroma and flavor volatiles.

These and other objects of this invention will become apparent by the description of the invention below.

SUMMARY OF THE INVENTION

The present invention relates to a process for preparing fruit or vegetable juice beverages by:
 (a) pressing the juice from the fruit or vegetable;
 (b) heating the fruit or vegetable juice to a temperature of from about 45° C. to about 110° C. for a time of from about 3 seconds to about 12 seconds;
 (c) aerosolizing the juice at a temperature of from about 10° C. to about 55° C. and at a pressure of from about 5 mm Hg to about 200 mm Hg such that a volatile fraction is separated from a dearomatized bottoms fraction;
 (d) recovering said volatile fraction at a temperature of from about 10° C. to about −190° C.
 (e) treating said bottoms fraction with pectinases at a temperature of from about 20° C. to about 40° C. for at least 30 minutes, said pectinases being substantially free of esterase activity; and
 (f) centrifuging or filtering the enzyme treated fraction.

The aerosol is created by spraying the heated juice through a nozzle having a diameter of from 100 to about 600 microns at a velocity of from about 100 m/sec. to about 250 m/sec.

The dearomatized beverage can then be sterilized and/or concentrated by any of a number of methods known in the art. The recovered aroma and flavor volatiles can be blended with a dearomatized concentrate to produce a beverage concentrate. When reconstituted with water, the resulting beverage will contain at least 75% of the aroma and flavor volatiles which were originally present in the beverage before it was processed.

The present invention also relates to a concentrated apple juice beverage made by this process from freshly pressed apple juice. This concentrated apple juice product has an acetate ester: ethanol ratio of from about 2:1 to about 140:1, a 5-hydroxymethylfurfural level of less than about 1 mg/liter and contains at least about 75% of the aroma and flavor volatiles which were present in the freshly pressed apple juice.

The volatiles recovered from one juice can also be blended with other beverages to produce blended beverage flavors. For example, apple and pear concentrates and the recovered aroma and flavor volatiles from either or both could be mixed to provide an apple/pear concentrate.

DETAILED DESCRIPTION OF THE INVENTION

Any beverage containing aroma and flavor compounds can be processed using this invention. Thus, the process is equally applicable to apple, cranberry, pear, peach, plum, apricot, nectarine, grape, cherry, currant, raspberry, gooseberry, blackberry, blueberry, strawberry, lemon, orange, grapefruit, potato, tomato, lettuce, celery, spinach, cabbage, watercress, dandelion, rhubarb, carrot, beet, cucumber, pineapple, custard-apple, cocona, pomegranate, guanabana, kiwi, mango, papaya, banana, watermelon and cantaloupe. Preferred juices are apple, pear, cranberry, orange, strawberry, grape and cherry.

Aroma and flavor volatiles are those compounds which partition from the beverage into the headspace above the beverage. Volatile compounds generally include a low boiling fraction, i.e., a highly volatile fraction, and a high boiling fraction, i.e., a less volatile fraction.

The highly volatile compounds are those which are eluted first from a capillary gas chromatographic column (described in detail later). For most fruit juices, and especially for apple juice, these compounds are characterized by having a boiling point less than about 131° C. These highly volatile compounds are generally low molecular weight aldehydes, ketones, alcohols, esters and acids. They also include low molecular weight sulfur compounds (e.g., thiols, sulfides), and low molecular weight nitrogen compounds (e.g., amines, pyrazines, pyridines, etc.). The volatiles include, but are not limited to, acetaldehyde, methanol, ethanol, butanol, hexanal, ethyl butyrate, ethyl acetate, propyl acetate, methyl propyl acetate, butyl acetate, methyl butyl acetate, hexyl acetate and acetic acid.

The lesser volatile fraction comprise those compounds which elute after the highly volatile compounds. In apple juice these compounds have a boiling point above about 131° C. These lesser volatile compounds include terpenes, higher molecular weight alcohols (e.g. linalool), esters, aldehydes (e.g. geranial, octanal, and decanal), ketones, ketoacids and oils.

The beverage concentrate composition herein can be made from an all-natural product. Although the following description of the process of this invention is described with particular reference to making an apple juice concentrate, it will be understood that the process is not limited thereto. Any beverage containing aroma and flavor volatiles and pectin may be used. Thus, the process is equally applicable to other fruit juices, e.g., pear, cranberry and grape juices, as well as vegetable juices.

Extraction of the Beverage

The juice is generally pressed or squeezed from washed fruit. The peel, rag, seeds and large pulp or cellulosic materials are then removed in a finishing step, if necessary. Preferably, the squeezing is accomplished under conditions designed to minimize oxidation, i.e., in an inert atmosphere. The fruit, and in particular the apples, are thoroughly washed to remove all adhering dirt. Washing may be accomplished by dumping the fruit or apples into troughs of moving water, after which they are separated from the water and given a final spray wash. They may also be washed by strong water sprays as they move along a roller-type conveyor. The apples are then sorted by hand to remove all partially or wholly decayed fruit. These decayed apples sometimes contain patulin, a toxin.

The washed and sorted apples which may consist of the various varieties from North, Central and South America, South Africa, Europe, Eastern Europe, Australia, New Zealand and China, are then prepared for extraction by reducing them to a mash. Preferably, the apples are mashed in an oxygen-restricted atmosphere, that is, where less than about 2% oxygen is present in the atmosphere surrounding the system. Two different pieces of equipment are generally used for this extraction procedure. The first type of mashing apparatus, a Rätz Mühle (manufactured by Lauffer Company, in Horb, Germany), grates the apples to a mash and is most commonly used in Europe. The other type which is most commonly found in North America, is a hammer mill, e.g. Fitzmill ®, made by Fitzpatrick Company, Elmhurst, Ill.) which smashes and cuts the apple such that it passes through openings of varying sizes as desired. This equipment is fully described in Possman et al., "Processing of Stored Fruit-Technical Concepts and their Costs", *Confructa Studien*, Vol. 29, November, 1985, pp 136–165, which is incorporated by reference herein.

The most common apparatus for expressing or separating the juice from non-soluble cell wall or tissue components in the expressed juice are (1) hydraulic cider press, (2) pneumatic juice press, (3) continuous screw type press, (4) continuous plate press, (5) semi-continuous plate press, (6) horizontal basket press, (8) a screening centrifuge, (7) rack and cloth press, and (9) continuous belt press.

If desired, the remaining tissue structures (pomace) can be slurried with water and treated with enzymes for the total liquefication of these remaining solid portions of the apple, such as starch, pectin and proteinaceous cell walls. This liquefied pomace can itself be further processed to extract additional juice by further expression by any of the above methods.

These methods for expressing juice by pressing and enzymatic treatment are more fully described in Nelson et al., *Fruit and Vegetable Juice Processing Technology*, AVI Publishing Co., pp 216–229 (1980) which is hereby incorporated by reference.

The preferred method of mashing the apples and removing the juice is the use of a Rätz Mühle to grind the apples and a continuous belt press to express the juice. Most preferred is the use of the Rätz Mühle and continuous belt press under an inert atmosphere. The inert atmosphere can be provided by blanketing the apparatus with nitrogen or another non-reactive, non-oxidative gas such as helium, argon or carbon dioxide. In this manner virtually all the oxygen is excluded from the process. This produces a better quality juice and pomace by avoiding or reducing any enzymatic or non-enzymatic oxidation and/or browning reactions in the mash.

The raw juice from fruits such as tomatoes, as it comes from the extractor or squeezing process contains pulp and seeds. These are separated from the juice in a "finisher". The finisher contains a screen which removes the pulp and seeds from the juice. The screen opening size can range from about 0.1 mm to about 2.5 mm. When the screen opening is larger than 2.5 mm, small seeds pass into the juice and contaminate it.

The expressed juice is then passed through a filter or hermetic centrifuge and deposited into a surge tank. The residence time in the surge tank, which is preferably blanketed in an inert atmosphere, must be kept to a minimum, preferably less than 15 minutes, to avoid any possible enzymatic and non-enzymatic oxidation and/or browning reactions and other loss of flavor and/or aroma. In order to maintain the quality and freshness of the juice, the temperature in the surge tank is preferably not higher than about 25° C. Temperatures much above 25° C. can cause apple juice to brown more rapidly.

In order to preserve the aroma and flavor of the juice and to minimize the activity of enzymes present in the juice, the juice should be held for as short a time as is possible before it is sterilized. Preferably the time from pressing the juice through sterilization is less than 15 minutes. The exact time will depend upon the size of the equipment and the efficiency of the sterilization unit.

Removal of Volatiles

The fruit or vegetable juice is pumped at a pressure of from about 800 psi to about 5000 psi, preferably from about 3500 psi to about 4500 psi, from the surge tank through a heat exchanger and heated to a temperature of from about 45° C. to about 110° C., preferably about 75° C. to about 95° C. for a time of from about 3 seconds to about 12 seconds, preferably about 3 seconds to about 9 seconds. The juice is fed into a vacuum chamber having a pressure of from about 5 mm Hg to about 200 mm Hg preferably 30 mm Hg to about 100 mm Hg and most preferably from 30 mm Hg to 70 mm Hg to create an aerosolized juice. A stream of the juice is fed into the chamber or sprayed into the chamber in a manner which creates submicron size droplets which are best described as a microfine aerosol. The temperature of the juice in the chamber is from about 10° C. to about 55° C.

In the preferred embodiment of this invention a stream of juice is accelerated through a nozzle or nozzle system consisting of a plurality of nozzles arranged in such a mode as to permit optimum vapor expansion substantially without liquid droplet collision. This calls preferably for a triangular nozzle cluster arrangement in the horizontal or vertical planes packing mode, into the vacuum chamber such that the juice is atomized into submicron droplets as a microfine aerosol.

It should be noted that apple juice contains small particles consisting of small cell wall fragments. These fragments will pass through the nozzle without adversely affecting the dispersal of the liquid portion of juice.

The nozzle through which the apple juice passes should have an opening of about 100 microns to 600 microns, preferably the opening is from 250 microns to about 400 microns. The velocity at which the juice travels through the nozzle is 100 m/sec to 300 m/sec, preferably 200 m/sec to 250 m/sec. A multitude of nozzle types can be used. However, it has been found that nozzles with hardened openings are preferred. Such preferred nozzle openings are made of hardened steel or semi-precious and precious stones (rubies, diamonds, sapphires, etc.) of a Mohs Scale hardness grade of 7 or higher. These hardened nozzle openings have been found to erode less rapidly than nozzle openings encased with ordinary steel or brass. Examples of nozzles and method of distributing liquids suitable for use in the present invention are found in Masters, K., *Spray Drying Handbook* (3rd Ed.), 1972 pp. 165–256, which is incorporated by reference herein.

If desired, from 80 psi to 150 psi of steam is introduced into the system to add activation energy for phase transformation in the system. Care must be taken not to add too great a quantity of steam; generally the condensed steam should comprise less than about 5% by weight of the juice. Steam can be metered into the column or directly into the juice by a needle-type valve which permits precise steam flow rates into the column.

Atomization or aerosolization of the juice greatly increases the surface area/weight ratio of each discrete liquid droplet of the juice to such an extent that the aroma and flavor materials instantaneously vaporize without significant diffusional delay under the pressure and temperature conditions specified. Of course, some of the water also vaporizes, ranging from about 0.1% to about 15% of the total starting liquid. This in situ transformation of water into steam aids in the near quantitative removal of the aroma flavor compounds from the submicron liquid droplets. These aroma and flavor components generally constitute less than about 0.05% to about 1.4% of the starting materials. Surprisingly, more than 75%, and in some instances as much as 90% or more, of the aroma components are transformed into vapors and are readily separable and therefor recoverable. This novel process provides a surprisingly high separation of aroma components in an instantaneous process without destruction or loss of the volatiles or of the nonvolatiles and without costly multi-stage steam stripping as previously used in the art.

During the process of aroma/flavor vaporization in the vacuum chamber, instantaneous cooling of the heated beverage occurs. The temperature reduction depends on the entrance temperature of the juice into the vacuum chamber and the vacuum. Final temperatures in the vacuum chamber range from 10° C. to 55° C., preferably from 20° C. to 40° C.

At the same time this process serves to both sterilize and to deoxygenate the beverage. Removal of substantially all the oxygen in the system is essential to avoid oxidative reactions from taking place during the aroma and flavor volatile removal. The aroma and flavor volatile removal step takes place at an elevated temperature which facilitates the undesirable interaction of oxygen with aroma and flavor compounds, and color bodies. In the presence of oxygen and elevated temperatures, the natural color of apple juice turns an unappetizing milky muddy color. As discussed above, the steam which can be optionally introduced would also provide energy to liberate the oxygen which has been absorbed into the beverage. The oxygen is removed from the juice via a vacuum pump and may be collected in, for example, a liquid nitrogen trap. Otherwise, the liberated oxygen can be reabsorbed onto both dissolved components and particulate components of the juice. Those oxygen molecules which are not collected in the trap are removed from the system and vented into the atmosphere.

The bottoms are pumped from the vaporizer and are treated in a depectinization step. The bottoms can be cooled and stored prior to depectinization. If the juice is cooled, energy can be saved if the hot juice is used to partially heat the incoming juice in a heat exchanger. It, in turn, is partially cooled thereby.

Recovery of the Volatiles

The aroma and favor volatiles are removed from the separation column or chamber and preferably passed through a demister which serves to retain any droplets or particles which cannot be atomized and are recovered by, for example, passing through a condenser system, ring pump, compression system or other means known in the art for condensing gases, and recovered at temperatures of from about 0° C. to about −190° C. The actual temperature of condensation will depend upon the flow rate of the vapors to be condensed and the heat exchange rate between the coolant and the volatiles within the condensation system. While the majority of the water vapor and some of the volatile compounds in the apple juice condense around 10° C., condenser temperatures of from about −100° C. to about −76° C. are sufficient to condense substantially all of the aroma and flavor volatiles from most fruit and vegetable juices at low pressure. The condensers are under the same pressure as the separation column or chamber.

The more readily condensable fraction, and the less condensable fraction, are preferably collected separately. The more readily condensable fraction actually consists of water and lower boiling hydrophilic components is collected at a temperature of from about −110° C. to about −75° C. This insures collection of virtually all the recovered volatiles from the juice.

The noncondensed vapors which remain in the system are finally condensed in a tortuous trap or traps. These traps collect at a temperature of from about −110° C. to about −76° C. and contain, for example, liquid Freon ®11 and carbon dioxide. Additional traps collect at a temperature of from about −195° C. to about −115° C. which will condense any remaining vapors from the system. Usually liquid air or liquid nitrogen is employed in this final trap.

The condensed materials are stored in closed tanks with an inert gas blanket, preferably nitrogen, and are preferably shielded from light to prevent light induced reactions of the aroma and flavor compounds. Relatively little water (from 0.1% to 14% of the weight of the starting juice) is contained in the condensates; thus it is not necessary to further separate the aroma and flavor materials from the condensate in rectification columns, as is necessary in the methods of prior art.

The aroma and flavor volatiles which have been removed can be utilized in a variety of ways. If a beverage concentrate is desired, the dearomatized beverage (the bottoms) are concentrated (as discussed below) to from about 20° Brix to about 80° Brix, and typically from about 30% to 100% of the removed volatiles are added to this concentrate. The volatiles may also be blended with other aroma and flavor volatiles for making mixed flavor beverages such as an apple/pear beverage. A nectar can be produced by mixing the aroma and flavor volatiles with a 1:1 mixture of bottoms fraction and naturally or artificially sweetened water to a concentration of about 11° Brix or less if a low calorie beverage is desired. Another use for these separated aroma and flavor volatiles is their addition to carbonated water or soft drink as a natural aroma and flavor ingredient.

This process can also be utilized to remove gaseous antioxidants such as sulfur dioxide in juices where, for example, the starting fruit or vegetable has been blanched in sulfur dioxide (a preservative).

Enzyme Treatment

The dearomatized bottoms fraction is treated with a pectinase, in particular a glycosidase. Glycosidases hydrolyze the intercellular binding plant substances causing disintegration of most of the fruit or vegetable tissues. Pectin glycosidases cleave the lowest esterified pectin, and insoluble, high molecular weight protopectins at the glycoside linkage. A pectin glycosidase which is substantially free of esterase activity is used. The esterases hydrolyze methoxylated pectins to methanol and pectin carboxylate compounds and also can hydrolyze any aroma and flavor esters. The formation of pectin carboxylates can cause precipitation due to the formation of insoluble pectin carboxylate metal salts, or protein complexes of the pectin carboxylate.

A preferred pectin glycosidase is Rohapect ® Mac which is available from Rhome Tech., Inc. (Maldin, Mass. 02148). Pectin glycosidases are prepared from aspergillus niger. Rohapect ® Mac is specially treated to remove the esterase activity.

Also preferred are glycosidases which are free of oxidase enzyme activity. These enzymes could oxidize the phenol and lower alcohol components of the juice.

The dearomatized bottoms fraction is heated to a temperature in the range of about (29° C.) 85° F. to about 125° F. (51° C.) while being treated with the enzyme. The pH of the bottoms fraction should be between about 2.8 to about 5. The pH may be adjusted, as necessary, to a value of from about 2.8 to about 5, with a food grade acid or base. For apple juice, a pH of from about 2.9 to about 4.0 is common. In general, apple juice does not need an adjUstment of its pH for the glycosidase hydrolysis to occur efficiently.

From about 1,000 pgu/mg to about 5,000 pgu/mg, preferably from about 2,000 to about 4,000 pgu/mg of pectinase is used. For Rohapect ® Mac a 10% solution is used. Pgu is a unit of pectolytic activity defined by that amount of an enzyme which catalyzes the change of the viscosity $1/n$ sp$=0.000015$ of a standard pectin solution under standard conditions. (2.1% pectin solution mixed with enzyme for 8 minutes at 30° C.; n sp is viscosity measurement in centipoise.)

The enzyme is allowed to react for at least about 30 minutes, and, preferably from about 1 hour to about 4 hours with slight stirring. During the enzyme treatment, it is preferred that the juice be shielded from light and oxygen to prevent oxidation reactions.

The enzyme treatment should be continued until the viscosity of the juice is from about 135 cps (centipoise) to about 110 cps at 29.4° C., and at ambient pressure. Usually this represents a 50% to 60% drop in the viscosity of the juice.

The removal of the pectin and protopectin also releases additional aroma and flavor volatiles which had been adsorbed by the pectins. When the product is packaged, the lower level of pectin allows for a better flavor display and a less viscous, more clear juice.

After the enzyme has hydrolyzed the pectins and protopectins, the juice is centrifuged or treated via ultrafiltration to remove the insoluble pectin hydrolysates. Any conventional centrifugation or ultrafiltration process can be used to remove the solids. The juice can be left slightly cloudy if not all of the solids are removed or it can be treated to make it absolutely clear.

The juice from the centrifugation or filtering can then be sterilized and packaged. To this juice, aroma and flavor volatiles would need to be added. In addition, the bottoms could be concentrated to make a juice concentrate. This is accomplished by evaporation or freeze concentration. However, since the aroma and flavor have been removed, it is preferred to evaporate the bottoms.

Evaporation of the Bottoms

Evaporation can be carried out in evaporators of the ascending or descending film type, in evaporators combining the ascending and descending film feature; in multiple tube evaporators, in plate type evaporators, expanding flow evaporators, and centrifuged evaporators, etc. Such evaporators are described by U. Schobinger and D. Sulc in *Handbuch der Getranketechnologie, Frucht-und Gemusesafte*, Verlag Eugen Ulmer, Stuttgart, Germany (1978), pages 223 to 288 and is incorporated by reference herein. The vacuum chamber or column used to remove the aroma flavor volatiles can also be used to concentrate the bottoms fraction.

The dearomatized beverage bottoms are concentrated by conventional evaporation techniques. These bottoms contain low molecular and high molecular weight carbohydrates, vitamins, non-volatile phenolic substances, lipids, metal ions, etc.

Evaporation economically removes water to increase the concentration of the juice to 40° Brix or higher (about 40% to about 75% sugar solids). The juice concentrate can be stored safely at reduced temperatures at these elevated concentrations. In addition, the evaporation step may collect any aroma and flavor materials which were not removed in the separation step or which were released during the removal of the pectin. Evaporation should be carried out in a manner that artificial, cooked or manufactured flavors are minimized or totally eliminated.

A multi-stage, multi-effect vacuum evaporator such as the TASTE (thermally accelerated short time evaporator) is used. The temperature profile used in this invention is controlled so that the maximum juice temperature is about 40° C. to about 90° C. A noticeable "cooked" flavor develops in juice concentrate even with the short residence time of these evaporators when the juice exceeds this temperature range. "Cooked" flavors are indicated by the production of 5-hydroxymethylfurfural which can be readily determined by high pressure liquid chromatography. The evaporators can be operated using either forward flow or mixed flow. The vessel where the steam is flowing is called an effect. The vessel where the juice flows is the stage. Forward flow occurs when the juice is fed to the same vessel as the steam and then follows a path through different vessels in parallel to the vapor flow. Mixed flow occurs when the juice is introduced to one of the intermediate vessels where it is evaporated by vapor generated in the preceding vessel. After partial concentration the juice is then fed to the first vessel where it is evaporated using fresh steam. Evaporation takes place in one or more stages following the feed stage and also following the first effect.

In each case, forward or mixed flow, the steam and the vapor flow in the first effect and in subsequent effects is in the same pattern. The vapor starts at the highest pressure and ends at the stage with the lowest pressure. Any suitable vacuum system can be used to remove non-condensables, but typically this will be a multi-stage steam ejector system. The process is operated at pressures of about 2 inches (50 mm) to about 4 inches (100 mm) of mercury absolute.

In a multiple effect evaporator, steam is used only on the first effect and each subsequent effect is heated by vapor evaporated in the preceding stage. This vapor is primarily water but it also contains volatile materials originally in the juice. These volatiles can be recovered by removing part of the vapors from the heating side of the evaporation effect. This removal stream is passed through a series of fractionators, condensers, and coolers to obtain a cold liquid essence rich in volatile fractions. This procedure is commonly practiced in the industry.

Newer types of evaporators such as the narrow bore ascending liquid column evaporator, Sigma Star (available from Schmidt GmbH., Bretten, Germany), are preferably applied. Also, a wiped film evaporator with the condenser built directly into the center of the wiped film evaporator, as in the short path evaporator manufactured by Leybold-Heraeus, Hanau, Germany for oil separation/distillation, is preferably applied.

The evaporator volatiles collected in the process herein are different from the commercial essences since almost all of the volatile materials have previously been removed in the aerosolization step.

These evaporator volatiles can be added back to the concentrated product in the blend tank. If the water content of the evaporator volatiles is high, or if the evaporator volatiles are to be stored, then it is more economical to concentrate the evaporator volatiles, e.g. by conventional rectification processes.

The evaporated concentrate is cooled and can either be pumped to a blend tank and mixed with other components of the product or further chilled to about $-18°$ C. and stored in tanks and drums under the inert gas atmosphere such as nitrogen or carbon dioxide. These storage tanks should be shielded from light to prevent light-induced degradation of the concentrate.

Other means of concentrating the dearomatized juice can be used. These would include reverse osmosis, sublimation concentration, freeze drying or freeze concentration. Economically, however, it is better to use an evaporation technique since the dearomatized juice contains relatively minute quantities of aroma and flavor volatiles and, therefore there is no real need to utilize a method which would retain aroma and flavor volatiles.

Blending

The condensed aroma and flavor volatiles prepared above can be blended in tanks with concentrated dearomatized juice to make a juice concentrate. If a citrus juice concentrate is to be made, pulp can also be added. It has been found that a concentration of pulp in the range of from 5% to 19% (v/v) is an acceptable concentration in a citrus juice concentrate. Preferably, the amount of pulp will be 6% to 12% (volume/volume) having a size of 0.50 mm. to 5 mm.

Packaging

The juice concentrate is then packaged to insure long-term stability. Preferably, the packaging materials should be impervious to oxygen and damaging light radiation. Optionally, the concentrate can be packed under an inert gas to minimize the oxygen content of any container headspace.

The product is kept at a temperature of 0° C. or less during long-term storage. Preferably, it is held at a temperature of from $-17°$ C. to $-74°$ C.

Apple Juice Aroma and Flavor Condensates

The natural juice concentrate prepared by the process described above is unique in its retention of at least 75% of the volatile compounds originally present in the starting juice and its low viscosity without additional methanol (above that originally present in the juice).

Gas chromatographic analysis of the volatile portion of apple juice indicates that there are at least 500 compounds, and probably considerably more, present in the volatile portion of apple juice. Complete identification of all of these volatile compounds has not yet been achieved. The volatile compounds which are believed responsible for the fresh aroma and flavor character of apple juice are composed of carbonyl compounds, acids, esters, terpenes, and other volatile hydrocarbons.

The acetate esters (ethyl acetate, propyl acetate, methyl acetate, methyl propyl acetate, butyl acetate and hexyl acetate) comprise about 0.1% up to about 80% of the volatile compounds and are partially responsible for the fruity character of apple juice. Their presence alone, however, does not produce the entire apple aroma and flavor. The retention of high levels of the acetate esters, along with the retention of at least 75% of the total volatile compounds, is indicative of the retention of volatile compounds which are present even in very minute amounts, and provides apple juice products which have a flavor and aroma closely approximating that of the natural juice.

It has also been found that freshly pressed natural apple juice contains a relatively low amount of alcohols, particularly ethanol. This composition is maintained in the product made from the process described herein. However, this is not the case in commercial juices prepared by conventional processes. In those juices the alcohol content is strikingly increased, ranging from about 45% to about 95% of the aroma/flavor volatiles, while the esters, especially acetate esters, are decreased down to about 5% to about 20% of their original amount.

For those reasons, the acetate esters, methanol and ethanol are strong indicators of the differences between natural and processed juices. Fresh natural juices have been found to have an acetate ester/ethanol ratio of from about 2:1 to 200:1. The volatile fraction and the juices manufactured by the process of the present invention s have an acetate ester: ethanol ratio of from about 2:1 to about 150:1, preferably about 5:1 to about 150:1 and most preferably 10:1 to about 150:1. Juices manufactured by processes known in the prior art have an acetate ester: ethanol ratio of from about 0.007:1 to about 1.5:1.

ANALYTICAL PROCEDURES

Gas chromatographic counts are the automatically integrated peak areas of the gas chromatograph recorder. They are directly related to the concentration of each of the compounds present in the volatile mixture.

The method for determining headspace concentrations of volatile compounds according to the present invention is as follows:

1. Equipment and Procedure

A 5 ml aliquot of the beverage is placed in a 65 ml head-space vial with a stir bar, and capped with Mininert ® sample valve. The headspace vial is equilibrated for 20 minutes at 20° C. prior to sampling 1 ml of the headspace using a 1 ml Hamilton gas tight syringe.

The volatile components of the headspace are analyzed using a Hewlett Packard 5880 GC equipped with an injector/trap (see Rodriguez et al., *J. Chromatogr.*, 236 (1982), pp. 36–49) and a 60 m.×0.25 mm. I.D. thick film (1 micron) J&W DB-1 fused silica column. The temperature program used is 10° C. to 220° C. at 5° C./minute and holding at that temperature for 5 minutes before ending the run.

2. Instrument Calibration and Calculations

In order to calculate the mass of the components in the headspace, two instrument parameters are determined. These are (1) the mass transfer efficiency through the injector/trap and the GC; and (2) the flame ionization detector (FID) response factor.

These measurements are performed using radiolabeled $^{14}C$-decane. The specific activity of the decane is 116 disintegrations per minute per nanogram. The decane is placed in a 65 ml headspace vial with a magnetic stir bar, capped with a Mininert ® valve and stirred for 1 minute at room temperature prior to sampling. Headspace samples are withdrawn using a 1 ml Hamilton gas-tight syringe.

The transfer efficiency is established by counting the ratio of the radioactive mass recovered from the instrument to the radioactive mass injected. A ratio of about 1.00, within experimental error (5%), indicates quantitative transfer of components through the instrument.

The FID response factor is established by calculating the ratio of the FID signal area corresponding to decane (in electronic integrator counts) to the mass of decane injected as determined by the decane specific activity. The response factor is referenced to the actual carbon content of the decane. In addition, the carbon based FID response factor for ethanol is established by the same method to provide quantification of oxygen containing compounds. The values determined (for the Hewlett Packard GC integrator System) are 3700 counts/nanogram carbon for decane and 2860 counts/nanogram carbon for ethanol.

3. Headspace Concentration Calculations

The quantitative volume/volume concentrations for the identified individual headspace (gas phase) components are then calculated by using the various factors of transfer efficiency, FID response and corresponding mass fraction of carbon for the individual component (upon which the FID response is based), and of the molecular weight, according to the following formula:

$$C_{gas} = A_{IC} \times 1/R_F \times 1/MW \times 1/V_S \times T \times MV \times 10^9$$

where:
- $C_{gas}$ = the headspace concentration (v/v) for each compound in ppb;
- $A_{IC}$ = area of the chromatographic peak in electronic integrator counts (using flame ionization detection);
- $R_F$ = response factor (integrator count/ng carbon) based on response factor for ethanol for oxygen containing compounds or decane for all other compounds;
- $F_C$ = the mass fraction of carbon in each compound;
- MW = the molecular weight of the compound in nanograms;
- $V_S$ = volume of headspace sample (ml.);
- T = transfer efficiency (value of 1.0 determined);
- MV = molar volume (in ml.) of an ideal gas at 20° C. and 1 atmosphere.

To illustrate the calculation of the concentration of ethanol in a headspace sample showing 100 hypothetical area counts, the following calculation is carried out:

$$C \text{ v/v gas} = 100 \times \frac{1}{2960} \times \frac{1}{\frac{24}{46}} \times \frac{1}{46 \times 10^9} \times \frac{1}{1} \times 1.0 \times 24060 \times 10^9$$

$$= 33.868 \text{ ppb ethanol}$$

The area counts and concentrations are presented to three significant figures corresponding to the accuracy of this method (approximately 10%).

Viscosity Measurement

A Brookfield viscometer equipped with a UL adapter, model LVT fitted with a number 1 spindle is used.

| | |
|---|---|
| Volume of samples analyzed: | 16 ml |
| Operating temperature: | 29.4° C. |
| Operating Pressure: | Ambient |
| Operating Speeds (rpms): | 3, 6, 12, 30, 60 |

Measurements are made using the same spindle at different speeds (revolutions per minute RPMs) to detect and evaluate the rheological properties of the test material.

Procedure

Approximately 100 ml of sample is stored in a closed lid, 4 oz. glass jar and immersed into a constant temperature water bath which is held at 29.4° C. The sample remains there until the 29.4° C. temperature is measured and recorded. A 16 ml sample is pipeted from the glass jar and into the UL adapter stainless steel tube which contains the cylindrical spindle. The accurately machined tube is immersed into a bath also held at 29.4° C. The viscometer is turned on and measurements are recorded at 3,6,12,30, and 60 rpms. Measurements are taken by depressing the clutch lever which raises the dial against the pointer and holds the instruments reading. These readings are then multiplied by a factor corresponding to the spindle speed (Shear Rate (/sec.)) and multiplied by 100 to give the full scale viscosity range.

The following non-limiting examples illustrate the methods and compositions of the present invention.

EXAMPLE 1

Part A 453.6 kg of a mixture of German apple varieties having an average diameter of 2.5 to 4.5 inches are washed thoroughly. The apples are then inspected to remove those of unsound, i.e., rotten or delayed, composition. The apples are then ground to a mash in a Rätz Mühle Model No. SFR2 to a particle size ranging from about 1 mm to about 3 mm in average diameter. The apple mash is pressed and then is screened with a continuous belt press (Bodenstab; Flottweg Type B-FRU-1000) with a yield of about 77% by weight of the starting apples. This amounts to about 349.3 kg of apple juice having a concentration of 12.1 Brix.

Part B

The juice from Part A is centrifuged on a Westfalia hermetically sealed centrifuge, Type SB #7-47-076, #1880 959, and is pumped into a holding tank. From there the juice is continuously pumped via Milton Roy Piston Pumps at a pressure of about 4000 psi through a tube and shell heat exchanger (to deactivate the enzymes and microorganisms). The residence time in the heat exchanger is about 9 seconds. The juice reaches a temperature of approximately 75° C. The juice then exits through a nozzle, in a funnel position, made of stainless steel with a sapphire lining and an opening of 508 microns at a velocity of about 250 m/second into a cylindrical vessel under a vacuum of 40-50 mm, thereby, atomizing the juice into submicron droplets and forming a microaerosol. The juice droplets are instantaneously cooled to a temperature of 24° C. due to the consumption of heat occurring during the partial vaporization. The vapors are then condensed in condensing systems consisting of a series of two coil condensers (cooled with ethylene glycol) at a temperature of about −10° C. and a series of two condensing vessels (cooled with liquid Freon ®11 and dry ice) at a temperature of about −110° C., and two tortuous traps (the first one cooled with liquid Freon ®11 and dry ice, and the second one with liquid nitrogen) at a temperature of about −190° C. The remaining juice (90%) is collected as bottoms in another trap and cooled with ice water.

Part C

Production of Clear Apple Juice

The bottoms fraction of apple juice resulting after removal of the volatile aroma components in Part B is heated to a temperature ranging from 25° C. to 32° C. Pectin glycosidases are added to the bottoms at a concentration of 400 ppm. (Rohapect ® Mac from Röhm GmbH, Darmstadt, Germany is used). The bottoms fraction is contained in a stainless .v steel tank equipped with a heating coil and a stirrer. The tank contents are shielded from light and air. Nitrogen blanketing is carried out during the entire process.

The bottoms fraction (containing the enzyme) is agitated for one to two hours at 29–32° C. The enzyme treated bottoms fraction is then subjected to ultrafiltration on a Romicon ultrafiltration unit model Pilot-Pro-50, equipped with 2 hollow fiber membrane cartridges (XM 50 with an inner diameter of 45 mils, and a XM 50 with 75 mils inner diameter tubing). Both cartridges are arranged in parallel position. The treated bottoms fraction is pumped into the hollow fibers under a pressure of 25 psi. The portion of the juice permeating the hollow fibers is called the permeate and consists of a clear bottoms fraction essentially free of microbes, but containing most all the essential non-volatile juice solids like carbohydrates, phenolic compounds, etc. The fraction remaining inside the hollow fibers consists of particles or molecules greater than 50,000 molecular weight (e.g. enzyme molecules, degraded pectin particles, microbes and other high molecular compounds). This latter fraction is called the retentate and is eventually discarded.

The permeate is collected under exclusion of air in a stainless steel container and stored at −17° C. until blending it with the combined aroma fraction to produce a reconstituted juice.

The reconstituted juice (i.e., bottoms fraction and stoichiometric amount of aroma fractions) is then subjected to UHT (ultrahigh temperature, short time sterilization treatment) in a Crepaco steam sterilizer, model UG 101. The sterilized juice is packed into clear glass bottles, Pure Paks (paper cartons) and Hypa Pacs (laminated paper cartons with aluminum bottoms and aluminum lids).

EXAMPLE 2

The enzyme treatment for production of cloudy apple juice is the same as for production of clear apple juice in Example I. However, no ultrafiltration is carried out. The enzyme treated bottoms fraction is centrifuged instead in a hermetically sealed Westfalia centrifuge, type: SB 7-47-076, No. 1880 959. The centrifugation removes part of the pectin splitting enzymes and the high molecular weight pectin aggregates consisting of high and low molecular weight pectins.

The centrifugate is then subjected to UHT-treatment to deactivate the enzyme. UHT-treated bottoms fraction is then concentrated to about 15° Brix. This is done in part on the aroma separator (Part B) and in part on a Leybold Heraeus evaporator. The 15° Brix bottoms fraction was is then combined with stoichometric quantities of the aroma fractions in a manner that excludes entrainment of oxygen. The combined fractions are then subjected to sterilization via UHT. A reconstituted juice results in a 11.8° Brix solids content. The resulting cloudy juice of this process is compared to non-enzyme treated juice by expert tasters. The enzyme treated juice exhibited a lesser viscosity and therefore had a more fluid mouthfeel which was deemed more desirable. Then non-expert tasters (90) tasted the enzyme treated juice, the test scores improved from a nonsignificant win to a significant win over a cloudy premium commercial juice. Taste test results are shown in the table below.

TABLE 1

Taste Test Data of Non-enzyme Treated and Enzyme Treated Juice vs a Premium Commercial Cloudy Juice

|  | Test Score |
|---|---|
| Non-enzyme Treated Cloudy* vs | 56% |
| Cloudy Premium Commercial Product | 44% |
| Enzyme treated Cloudy Juice (Example I) vs | 71% |
| Cloudy Premium Commercial Juice | 29% |

*This is a juice made by reconstituting the juice from Part A and Part B of Example 1.

GC Data

The aroma and flavor volatiles present in the juice were analyzed by the headspace method described above. The total gas chromatographic counts shows a difference of 27.5% with the same level of volatiles. This is due to the lower level of pectin in the product of Example 2 which allows for more aroma release.

| (A) Headspace data | GC Counts (Total) |
|---|---|
| (1) Aroma separated enzyme treated (Rohapect ® Mac), concentrated, reconstituted, UHT-treated (Example 2) | 239,751 |
| (2) Aroma sparated, concentrated reconstituted, UHT-treated | 173,757 |

A comparison of the concentrations of some of the key volatiles is given below:

| Selected Volatiles | Enzyme Treated | No Enzyme Treatment |
|---|---|---|
| Acetaldehyde | 2595 | 0 |
| Methanol | 0 | 0 |
| Ethanol | 3277 | 0 |
| Ethyl Acetate | 177 | 0 |
| Propyl Acetate | 2136 | 1873 |
| Methyl Butyrate | 233 | 299 |
| S-Butyl Acetate | 521 | 0 |
| I-Butyl Acetate | 552 | 420 |
| Hexanal | 36191 | 23999 |
| 3-Hexanol | 0 | 0 |
| Ethyl Butyrate | 12521 | 7264 |
| N-Butyl Acetate | 36516 | 40687 |
| Hexyl Acetate | 26027 | 19568 |
| 2,3 Amyl Acetate | 840 | 0 |
| 2-Methylbutyl Acetate | 11268 | 12055 |
| I-Butyl Valerate | 1118 | 793 |
| N-Amyl Butyrate | 798 | 653 |
| Butyl Hexanoate | 8992 | 7902 |
| Amyl Acetate | 777 | 0 |

EXAMPLE 3

Production of Clear Apple Juice (II)

Production of clear apple juice is carried out under essentially identical conditions as in Example I for production of clear apple juice. However, instead of using an enzyme which is substantially free of esterases a conventional pectinase enzyme (Ultrazyme) is used. It contains polygalacturonase, pectin transeliminase, pectin esterase, and hemicellulases.

The gas chromatographic data indicate that not only are copious quantities of methanol produced, but the content of total alcohols in the headspace is increased and the total content of aroma esters is significantly decreased. The overall increase of alcohols is probably due to esterase activity contained in the conventional pectin enzyme system which apparently not only splits the methyl ester bonds of the pectinous carboxy methyl esters, but also in general the ester linkages of the aroma esters contained in the fresh juice. For detailed data see Table 2.

TABLE 2

| | Headspace Data | | | | | |
|---|---|---|---|---|---|---|
| | Juice 1 | | Juice 2 | | Juice 3 | |
| | A | B | A | B | A | B |
| Methanol | 1.92 | 23.6 | 1.6 | 21.0 | 1.4 | 26.6 |
| Total Alcohols | 44.7 | 64.8 | 19.1 | 39.0 | 32.6 | 55.9 |
| Total Esters | 24.7 | 12.0 | 56.3 | 39.0 | 25.6 | 16.1 |

Wherein:
A is a juice sample which has been treated as in Part A and Part B of Example 1, reconstituted and sterilized.
B is a juice sample which has been treated as in Example 3, reconstituted and sterilized.
Juice 1 is made from Southern German Apples
Juice 2 is made from Northern German Apples
Juice 3 is made from Central German Apples

What is claimed is:
1. A process for preparing a beverage which comprises:
(a) pressing juice from a fruit or vegetable;
(b) heating the fruit or vegetable juice to a temperature of from about 45° C. to about 110° C. for a time of from about 3 seconds to about 12 seconds,
(c) aerosolizing said juice at a temperature of from about 10° C. to about 55° C. at a pressure of from about 5 mm Hg to about 200 mm Hg such that a volatile fraction is separated from a dearomatized bottoms fraction;

(d) recovering said volatile fraction at a temperature of from about 10° C. to about −190° C.

(e) treating said bottoms fraction with pectinase enzymes at a temperature of from about 20° C. to about 40° C, said pectinases being substantially free of esterase activity; and (f) centrifuging or filtering the enzyme treated fraction and (g) adding aroma and flavor volatiles to the enzyme treated fraction to make a beverage.

2. A process according to claim 1 wherein the enzyme treatment of step(e) is for at least about 30 minutes to about 4 hours.

3. A process according to claim 2 wherein the pH of the bottoms fraction in step (e) is from about 2.8 to about 5.

4. A process according to claim 3 wherein the enzyme treated fraction is filtered by ultrafilteration.

5. A process according to claim 3 wherein the juice is apple juice.

6. A process according to claim 3 wherein the juice is heated in step (a) to a temperature of from about 75° C. to about 95° C. for a time of from about 3 seconds to about 9 seconds.

7. A process according to claim 6 wherein the juice is aerosolized at a temperature of from about 20° C. to about 40° C. at a pressure of from about 30 mm to 100 mm by spraying said juice through a nozzle opening of about 100 microns to about 600 microns at a velocity of 200 m/sec. to about 250 m/sec 8. A process according to claim 7 wherein said juice is dispersed through a nozzle with an opening of from about 250 microns to about 600 microns.

9. A process according to claim 8 wherein said juice is dispersed through a nozzle at a velocity of from about 200 m/sec. to about 250 m/sec.

10. A process according to claim 9 wherein said volatiles are recovered by condensation.

11. A process according to claim 10 wherein said process is carried out in a substantially oxygen-free environment.

12. A process according to claim 11 wherein said beverage is a fruit juice.

13. A process according to claim 12 wherein said beverage is apple juice.

14. A process according to claim 12 wherein said beverage is selected from the group consisting of pear, grape, cherry, orange and cranberry juice.

15. A process according to claim 3 wherein the dearomatized and pectinase treated bottoms fraction is concentrated to from about 20° Brix to about 80° Brix and wherein from about 30% to 100% of said volatile fraction is blended into said concentrated dearomatized bottoms fraction thereby producing a beverage concentrate.

16. A process according to claim 11 wherein the dearomatized and pectinase treated bottoms fraction is concentrated to from about 20° Brix to about 80° Brix and wherein from about 30% to about 100% of said volatile fraction is blended into said concentrated dearomatized bottoms fraction thereby producing a beverage concentrate.

17. A process according to claim 16 wherein said juice is apple juice.

18. The beverage concentrate product of the process of claim 13.

19. The beverage concentrate product of the process of claim 14.

20. A processed apple juice concentrate according to claim 17 which is prepared from fresh apple juice wherein said processed apple juice concentrate contains at least about 75% of the volatile compounds originally found in the fresh apple juice and no additional methanol.

* * * * *